United States Patent [19]

Shidlovsky

[11] 3,941,715
[45] Mar. 2, 1976

[54] SUBSTITUTED ZIRCONIUM PYROPHOSPHATE PHOSPHORS

[75] Inventor: Igal Shidlovsky, Princeton, N.J.
[73] Assignee: RCA Corporation, New York, N.Y.
[22] Filed: Mar. 24, 1975
[21] Appl. No.: 561,354

[52] U.S. Cl...... 252/301.4 P; 252/301.4 F; 423/306
[51] Int. Cl.² .......................................... C09K 11/42
[58] Field of Search ............... 252/301.4 P, 301.4 F; 423/306

[56] References Cited
UNITED STATES PATENTS

| | | | |
|---|---|---|---|
| 2,596,509 | 5/1952 | Ranby | 252/301.4 P |
| 2,770,749 | 11/1956 | Bril et al. | 313/467 |
| 2,824,072 | 2/1958 | Butler | 252/301.4 P |
| 2,966,605 | 12/1960 | Harris et al. | 252/301.4 P X |
| 3,017,365 | 1/1962 | Harrison | 252/301.4 P X |
| 3,513,105 | 5/1970 | Ward | 252/301.4 P X |

FOREIGN PATENTS OR APPLICATIONS

| | | | |
|---|---|---|---|
| 2,113,240 | 12/1971 | Germany | 252/301.4 P |

OTHER PUBLICATIONS

Bril et al., "Philips Research Rep.," 7, pp. 421–431, 1952.
Kroger et al., "Chemical Abstracts" Vol. 48, 3150a, 1954.
Lushchik, "Chemical Abstracts" Vol. 58, 112f, 1963.
Treichler et al., "Chemical Abstracts" Vol. 68, 82849z, 1968.

*Primary Examiner*—Jack Cooper
*Attorney, Agent, or Firm*—G. H. Bruestle; L. Greenspan

[57] ABSTRACT

Self-activated ultraviolet-emitting zirconium pyrophosphate phosphors, wherein 0.01 to 20 mole percent of the zirconium is substituted with one or more of hafnium, germanium and silicon. The phosphors, which may be excited by ultraviolet radiation, x-rays and electron beams, may be used as energy converters in photodevices.

5 Claims, 2 Drawing Figures

SUBSTITUTED ZIRCONIUM PYROPHOSPHATE PHOSPHORS

BACKGROUND OF THE INVENTION

This invention relates to novel ultraviolet-emitting phosphors and to methods of preparation thereof.

Very little is known about inorganic cathodoluminescent materials which can emit at wavelengths shorter than 3000 A, and very few such phosphors are known. One such phosphor, disclosed in U.S. Pat. No. 2,770,749 to A. Bril et al, is a self-activated zirconium pyrophosphate phosphor ($ZrP_2O_7$). This phosphor contains highly-charged zirconium ions with an $np^6nd^0$ configuration. The emission is believed to come from the metal ions themselves through charge-transfer transitions between the $O^{2-}$ anions and the central metal ion. No activators are needed for this process.

SUMMARY OF THE INVENTION

The novel phosphors herein consist essentially of zirconium pyrophosphate wherein 0.01 to 20 mole percent of the zirconium is substituted with at least one of hafnium, germanium and silicon. The unsubstituted phosphor may be represented by the molecular formula $ZrP_2O_7$. The novel phosphors may be represented by the molecular formula $Zr_{1-x}M_xP_2O_7$ wherein M is at least one of Hf, Ge and Si and x is in the range of 0.0001 to 0.20.

The novel phosphors are roentgenoluminescent, cathodoluminescent and photoluminescent, emitting in broad spectral bands which peak at about 2800 to 3000 A. The novel phosphors may be used for their ultraviolet emission; for example, in cathode-ray display tubes, flying-spot scanners, or in any of the applications mentioned in the above-cited patent to Bril et al.

DETAILED DESCRIPTION OF THE PREFERRED EMBODIMENTS

EXAMPLE 1

Figure 1:
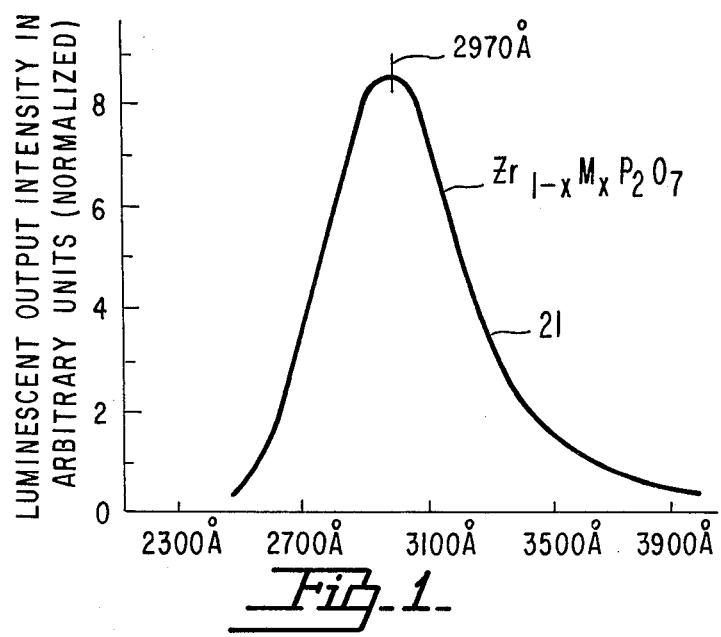
FIG. 1 is a spectral-emission curve which is typical of the novel substituted zirconium pyrophosphate phosphors.

To prepare a hafnium-substituted zirconium pyrophosphate phosphor, react 0.0125-gram hydrated hafnium oxychloride, $HfOCl_2 \cdot 8H_2O$, with hot concentrated phosphoric acid. The quantity of phosphoric acid is more than the stoichiometric amount needed for converting all of the oxychloride to pyrophosphate. Then, add 8 grams of hydrated zirconium oxychloride, $ZrOCl_2 \cdot 8H_2O$, to the mixture. The reaction is done in a Teflon container while stirring. The heating and stirring are continued until a homogeneous slurry is formed. Usually the slurry is kept at the mixing temperature of above 100°C for about 4 hours. Then the slurry is transferred to a silica container and placed in a furnace for the following heat treatment in air: 400°C for about 15 hours, 800°C for about 6 hours, and then 1000°C for about 15 hours. The reaction product is cooled to room temperature, crushed and ground, and then refired in air at about 1200°C for about 6 hours. The product is then cooled to room temperature. The product is $Zr_{0.99}Hf_{0.01}P_2O_7$ having the cubic crystal structure with $a = 8.2448$ A. The product is roentgenoluminescent, photoluminescent, and cathodoluminescent, emitting in the 2200 to 3200 A spectral range with a peak at about 2970 A. With cathode-ray excitation, the phosphor exhibits a power efficiency of about 10.2 percent. The cathodoluminescence emission spectra obtained from the sample is similar to the one shown in FIG. 1.

EXAMPLE 2

To prepare a silicon-substituted zirconium pyrophosphate phosphor, react 0.0125-gram hydrated $SiO_2$ with hot concentrated phosphoric acid. Then add 8.0 grams of hydrated zirconium oxychloride to the mixture. Then, follow the same procedure described in Example 1. The product is $Zr_{0.995}Si_{0.005}P_2O_7$ having a cubic crystal structure with $a = 8.2430$ A. The product is roentgenoluminescent, photoluminescent, and cathodoluminescent, emitting in the 2200 to 3200 A spectral range with a peak at about 2960 A. With cathode-ray excitation, the phosphor exhibits a power efficiency of about 10.8 percent. The cathodoluminescent emission spectra obtained from the sample is similar to the one shown in FIG. 1.

EXAMPLE 3

To prepare a germanium-substituted zirconium pyrophosphate phosphor, react 0.013 gram of germanium dioxide with hot concentrated phosphoric acid and then add 8.0 grams of hydrated zirconium oxychloride powder. Then, follow the same procedure described in Example 1. The reaction product is $Zn_{0.995}Ge_{.005}P_2O_7$ having a cubic crystal structure with $a = 8.2438$ A. The product is roentgenoluminescent, photoluminescent and cathodoluminescent, emitting in a broad band which peaks at about 2970 A with a power efficiency of about 9 percent. The emission spectra obtained from the sample is similar to the spectral emission curve shown in FIG. 1.

EXAMPLE 4

Follow the procedure in Example 1 except substitute a mixture of $P_2O_5$ and water for the phosphoric acid. The resulting product is similar to the one described in Example 1.

EXAMPLE 5

Follow the procedure in Example 2 except substitute a mixture of $P_2O_5$ and water for the phosphoric acid. The resulting product is similar to the one described in Example 2.

EXAMPLE 6

Follow the procedure in Example 3 except substitute a mixture of $P_2O_5$ and water for the phosphoric acid. The resulting product is similar to the one described in Example 3.

GENERAL CONSIDERATIONS

The novel phosphor may be prepared by a variety of synthesis methods. All of the examples involve the synthesis of the novel pyrophosphate phosphors by a first method from phosphoric acid or $P_2O_5$ and water, which serve as the sources of phosphate anions. The pyrophosphates claimed in the application can be prepared also by a second method from ammonium dihydrogen phosphate, sodium pyrophosphate or other light-cation water-soluble phosphates. Phosphors prepared by the first method with phosphoric acid or $P_2O_5$ and water exhibit superior roentgenoluminescent, cathodoluminescent and photoluminescent properties to phosphors prepared from the light-cation phosphate salt. The product of the first method is single-phase cubic material which is free from residual oxides. Residual oxide is always present as a second phase in the novel pyrophosphate phosphors prepared by the second method.

By the first method of synthesis, a zirconium compound and a compound of at least one of Hf, Ge and Si are reacted with phosphoric acid or $P_2O_5$ and water. The first method yields pure pyrophosphates that are substantially free of residual oxide. In one embodiment of the first method, the synthesis is done by reacting oxychlorides and phosphoric acid (or a solution of $P_2O_5$ and water). A mixture of zirconium and substituent cation oxychlorides and phosphoric acid is first heated while stirring in a Teflon container on a hot plate. Then the mixture is transferred to a silica container. The container and contents are heated gradually to 1000°C. First, the temperature of the container is raised to 400°C, then to 800°C, and then to 1000°C, soaking the contents for a few hours at each of the mentioned temperatures. After the heat treatment at 1000°C, the material is cooled to room temperature, crushed and ground. Then, the ground material is heated in air at 1200°C.

By the second method of synthesis, a zirconium compound and a compound of one or more of hafnium, silicon and germanium are reacted with a phosphate compound. Any zirconium compound, such as zirconium oxide or zirconium oxychloride, may be used. Similarly, any compound of Hf, Si and Ge may be used. Any phosphate, such as ammonium phosphate, ammonium dihydrogen phosphate, sodium pyrophosphate, or potassium dihydrogen phosphate, may be used. Water-soluble phosphates of light cations are preferred. Besides zirconium, one or more substituent cations, and phosphate ions, no other ions are necessary. Cations which degrade the luminescence in the product, particularly cations of the heavy metals, should be avoided. The materials should be thoroughly mixed, and then given a preliminary firing to reduce the volatilization of phosphate during the main firing. Then, the mixture is reheated in air at temperatures between 1000° and 1300°C, preferably 1150° to 1250°C, for any convenient length of time greater than about 30 minutes, and then cooled to room temperature. The reheating (main firing) cycle may be repeated as many times as is desired in order to improve the uniformity of the product. The starting mixture may be mixed as dry powders, but is preferably mixed with an excess of water, which is later evaporated. The wet mixing helps to obtain a more homogeneous mixture. After the water is evaporated from the slurry, the remaining solid is ready for heat treatment. Following heat treatment, the reaction product may be washed to remove any water-soluble material that is present.

FIG. 1 shows a typical cathodoluminescence spectral emission curve 21 for substituted zirconium pyrophosphate phosphors. Generally, the emission spectra for the novel phosphors peak between 2950 and 2980 A. The novel phosphors exhibit power efficiencies of up to about 11 percent. Other cation substitutions than hafnium, silicon and germanium were found to be detrimental to the emission in the ultraviolet region which peaks below 3000 A.

U.S. Pat. No. 2,770,749 issued to A. Bril et al. describes a self-activated zirconium pyrophosphate phosphor $ZrP_2O_7$, which is said to emit in a broad band which peaks at about 2850 A with power efficiency of about 4 percent. That efficiency is much lower than the efficiencies of the novel substituted zirconium pyrophosphate phosphors. The novel substituted phosphors luminesce in the ultraviolet region, and their emission peaks are at somewhat longer wavelengths than the prior unsubstituted zirconium pyrophosphate phosphors but with much higher power efficiencies.

Figure 2:
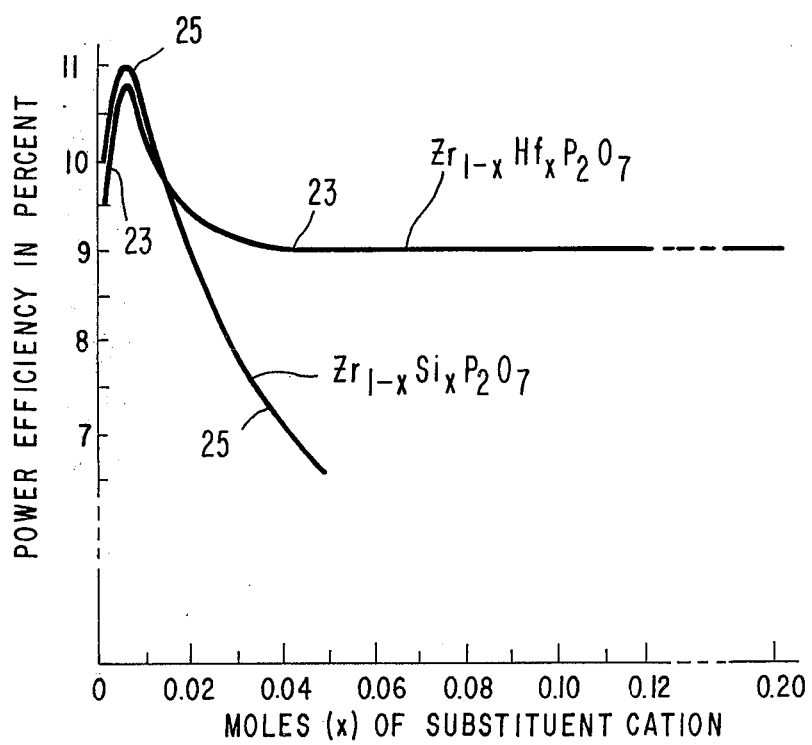
FIG. 2 comprises two curves showing the effect on power efficiency of substituting hafnium for up to about 20-mole percent of zirconium in $ZrP_2O_7$, and silicon for up to about 5-mole percent of the zirconium in $ZrP_2O_7$.

Impurities which are introduced into the starting mixtures of synthesis may have a large influence on the cathodoluminescence power efficiency of the phosphors. Substituting one or more of silicon, germanium and hafnium for a portion of the zirconium in zirconium pyrophosphate increases significantly the cathodoluminescence efficiency of the phosphor. Curve 23 of FIG. 2 shows the power efficiencies of novel phosphors which contain up to about 20 mole percent hafnium versus the amount of substitution in mole percent. Curve 25 of FIG. 2 shows the power efficiencies of novel phosphors which contain up to about 5 mole percent silicon. The most efficient phosphors are those containing around 0.1 to 1.0 mole percent of substituent cations, where the power efficiencies were measured to be over 8 percent, and the emission peaks were measured at between 2950 and 2980 A.

I claim:
1. A luminescent material consisting essentially of $Zr_{1-x}M_xP_2O_7$, wherein M is at least one of Hf, Ge and Si, and x is in the range of 0.0001 and 0.20, said luminescent material having a cathodoluminescent power efficiency greater than that of unsubstituted self-activated $ZrP_2O_7$ phosphor.

2. The luminescent material defined in claim 1, wherein x is in the range of 0.001 to .01.

3. The luminescent material defined in claim 1, wherein M is Hf.

4. The luminescent material defined in claim 1, wherein M is Ge.

5. The luminescent material defined in claim 1, wherein M is Si.

* * * * *